US009441972B2

(12) United States Patent
Belanger et al.

(10) Patent No.: US 9,441,972 B2
(45) Date of Patent: Sep. 13, 2016

(54) METHOD OF ASSISTING IN THE NAVIGATION OF A ROTORCRAFT BY DYNAMICALLY DISPLAYING A REPRESENTATION OF THE OUTSIDE WORLD CONSTRUCTED IN FLIGHT IN INSTANTANEOUS AND/OR DEFERRED MANNER

(71) Applicant: AIRBUS HELICOPTERS, Marignane (FR)

(72) Inventors: Nicolas Belanger, Fos Sur Mer (FR); Francois-Xavier Filias, Pelissanne (FR); Geoffroy Pertuisot, Marignane (FR); Nicolas Damiani, Marseille (FR)

(73) Assignee: Airbus Helicopters, Marignane (FR)

( * ) Notice: Subject to any disclaimer, the term of this patent is extended or adjusted under 35 U.S.C. 154(b) by 8 days.

(21) Appl. No.: 14/597,407

(22) Filed: Jan. 15, 2015

(65) Prior Publication Data

US 2015/0204672 A1 Jul. 23, 2015

(30) Foreign Application Priority Data

Jan. 20, 2014 (FR) ..................................... 14 00103

(51) Int. Cl.
*B64D 43/00* (2006.01)
*G01C 21/16* (2006.01)
(Continued)

(52) U.S. Cl.
CPC ............. *G01C 21/005* (2013.01); *B64D 43/00* (2013.01); *B65D 47/08* (2013.01); *G01C 21/165* (2013.01); *G01C 23/00* (2013.01); *G01S 11/12* (2013.01); *G06T 7/0075* (2013.01); *G06T 2207/30181* (2013.01)

(58) Field of Classification Search
CPC .. G01C 21/005; G01C 21/165; G01C 23/00; B64D 43/00; B64D 47/08; G01S 11/12; G06T 7/0075
See application file for complete search history.

(56) References Cited

U.S. PATENT DOCUMENTS 7,365,652 B2    4/2008   Scherbarth
7,642,929 B1 *   1/2010   Pinkus ................... G01C 23/00
                                                                            340/946

(Continued)

FOREIGN PATENT DOCUMENTS

EP       1650534       4/2006
EP       2133662      10/2009

OTHER PUBLICATIONS

French Search Report for FR 1400103, Completed by the French Patent Office on Oct. 24, 2014, 8 Pages.

(Continued)

*Primary Examiner* — Aaron L Troost
(74) *Attorney, Agent, or Firm* — Brooks Kushman P.C.

(57) ABSTRACT

A method of assisting in the navigation of a rotorcraft by displaying in flight a dynamic representation of the outside world (Me) in the event of a loss of visibility (brown-out/white-out). Front maps with incorporated localization are generated on the basis of front images captured by a set of front cameras. Terrain elevation data is generated from images captured by complementary sets of lateral and rear cameras. In the event of a loss of visibility, a reconstituted world (Mr) is prepared from the front maps with incorporated localization. On request of the pilot, an extrapolated world (Mex) is prepared by adding terrain elevation data to the front maps with incorporated localization, in compliance with the common time and the relative positions of the various sets of cameras between one another.

16 Claims, 2 Drawing Sheets

(51) Int. Cl.
  *G01C 23/00* (2006.01)
  *G06T 7/00* (2006.01)
  *B64D 47/08* (2006.01)
  *G01S 11/12* (2006.01)
  *G01C 21/00* (2006.01)
  *B65D 47/08* (2006.01)

(56) References Cited

U.S. PATENT DOCUMENTS

| | | |
|---|---|---|
| 8,019,490 B2 | 9/2011 | Ferren et al. |
| 2014/0327770 A1* | 11/2014 | Wagreich ............. G05D 1/0038 348/148 |

OTHER PUBLICATIONS

Steder et al. IEEE Transactions on Robotics Oct. 1, 2008, vol. 24, No. 5, p. 1088-1093, "Visual Slam for flying vehicles."
Jung et al. Proceedings of the ninth IEEE international conference on computer vision (ICCV) Oct. 13-16, 2003, vol. Conf.9, p. 946-951, "High resolution terrain mapping using low altitude aerial stereo imagery."
O'Brien et al. Degraded visual environments: enhanced, synthetic, and external vision solutions May 16, 2013, vol. 8737, 13 Pages, "Helicopter synthetic vision based DVE processing for all phases of flight."

* cited by examiner

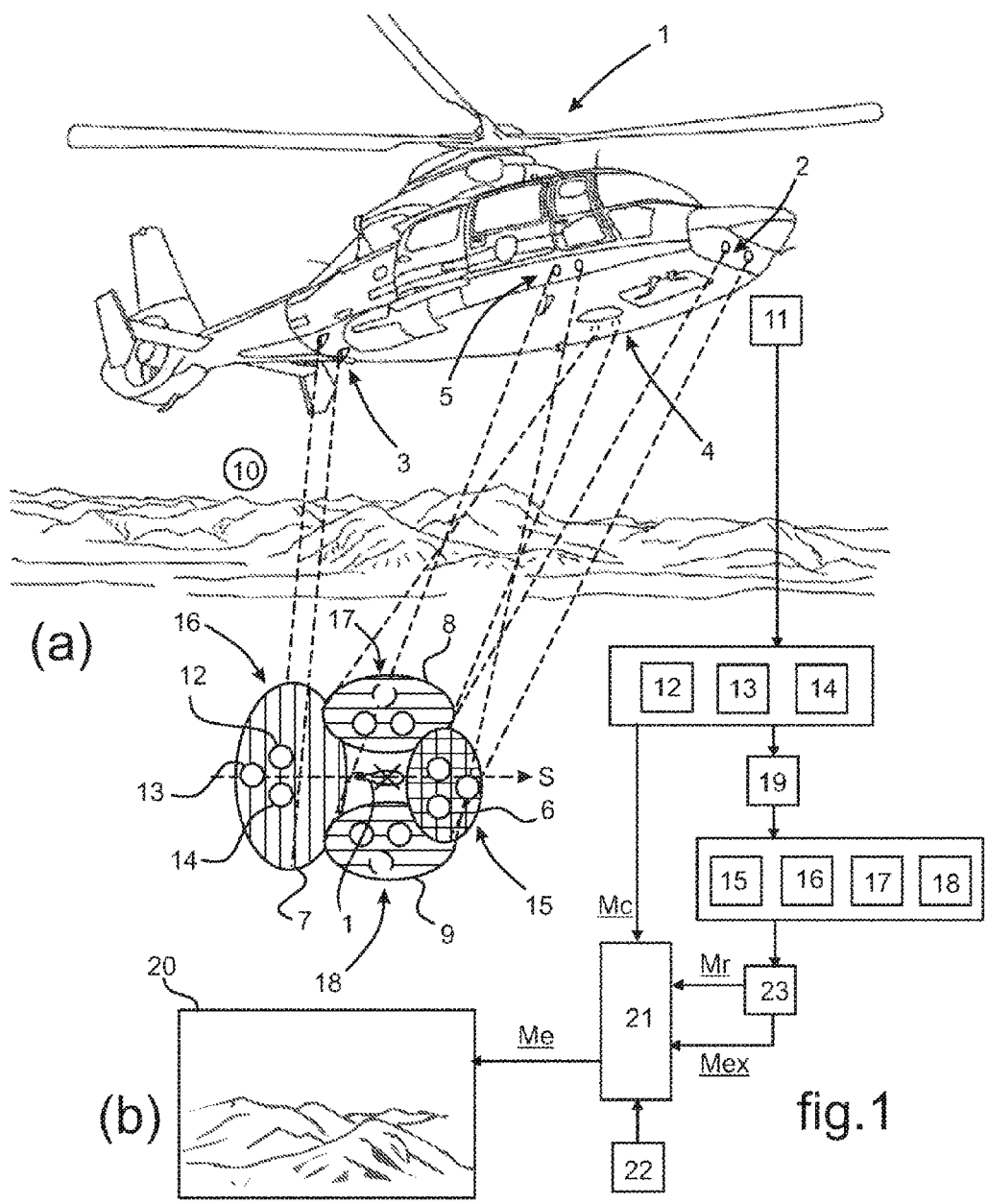
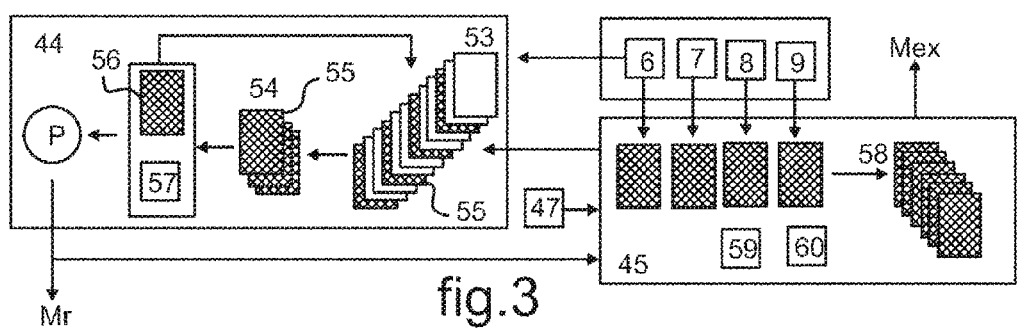

METHOD OF ASSISTING IN THE NAVIGATION OF A ROTORCRAFT BY DYNAMICALLY DISPLAYING A REPRESENTATION OF THE OUTSIDE WORLD CONSTRUCTED IN FLIGHT IN INSTANTANEOUS AND/OR DEFERRED MANNER

CROSS REFERENCE TO RELATED APPLICATION

This application claims priority to French patent application No. FR 14 00103 filed on Jan. 20, 2014, the disclosure of which is incorporated in its entirety by reference herein.

BACKGROUND OF THE INVENTION (1) Field of the Invention

The present invention relates to the field of systems for providing assistance in navigating a rotorcraft by processing images captured in flight and by constructing in flight and then dynamically displaying a representation of the outside world on the basis of the previously captured images.

The present invention relates more particularly to such navigation assistance systems that are suitable for displaying a dynamic representation of the outside world in a situation in which the pilot of a rotorcraft has lost visibility.

(2) Description of Related Art

Such a loss-of-visibility situation is caused in particular by the rotorcraft flying near the ground, which typically leads to clouds of particles being formed in the environment outside the rotorcraft. Said clouds of particles, such as dust or snow for example, give rise to a loss-of-visibility situation that is commonly referred to as "brown-out/white-out".

Rotorcraft are aircraft in which lift is provided by at least one rotor having a substantially vertical axis, and they are suitable in particular for flying close to the ground not only at high speeds, but also typically at low speeds and/or while hovering. As an indication, a rotorcraft is commonly considered as having a low forward speed when its speed is less than 50 knots (kt) and high speeds of 125 kt or 150 kt or even more can be reached, in particular in a rotorcraft having propulsive propellers of substantially horizontal axis providing the rotorcraft with additional propulsion in translation.

Rotorcraft present the advantage of being able to fly under such flying conditions in any environment, which environment need not necessarily have been previously prepared or even identified.

Nevertheless, in this context, the problem of a brown-out/white-out situation arises when the rotorcraft is flying close to the ground and by way of indication at a height above the ground of less than 15 meters (m). Close to the ground, the rotor(s) of the rotorcraft raise clouds of particles that lead to a loss of visibility for the pilot of the rotorcraft. It is therefore useful to assist the pilot in navigation in the event of such a loss of visibility.

In order to provide such navigation assistance, it is known in a brown-out/white-out situation to provide the pilot with a display showing an artificial dynamic representation of the environment outside the rotorcraft, referred to below as the "outside world". To this end, the representation of the outside world as displayed is constructed by a navigation assistance system on the basis of images that were captured in flight prior to the brown-out/white-out situation.

On this topic, reference may be made to the following documents EP 1 650 534 (EADS Deutschland), U.S. Pat. No. 7,642,929 (US Air Force), and U.S. Pat. No. 8,019,490 (Applied Minds), which disclose ways of implementing such navigation assistance systems in a brown-out/white-out situation.

Known solutions make use of at least one set of cameras facing towards the front of the rotorcraft, pointing together in the direction of a common front line of sight. The rotorcraft may also be fitted with at least one set of lateral cameras likewise pointing in the direction of a common lateral line of sight.

The concepts of "front", "lateral", "rear", "right", and "left" are commonly identified relative to the forward travel direction of the rotorcraft.

The cameras in a given set provide individual images of the environment outside the rotorcraft so as to provide the navigation assistance system with stereoscopic images giving terrain elevation data relating essentially to the topography of the terrain. The images, referred to below as "captured images", are captured sequentially by the cameras at a given frequency in the form of digital data constituted by pixels.

Image processing means, such as texturing means for example, may optionally be used for processing the captured images by calculation in order to improve the visual effect of the display of the representation of the outside world derived from the images captured by the camera.

In the absence of a brown-out/white-out situation, and on request of the pilot, the current captured images picked up by the cameras may be displayed in order to provide the pilot with a dynamic display of a representation of the outside world, referred to below in this specific circumstance as the "current outside world".

Furthermore, the on-board instrumentation of the rotorcraft includes in particular an inertial unit that conventionally delivers navigation data relating at least to the current state vector of the rotorcraft. The state vector of the rotorcraft represents in particular the relative or absolute position of the rotorcraft, the speed and more particularly the ground speed of the rotorcraft, and the orientation and/or the change in attitude of the rotorcraft as it progresses.

The navigation data of the rotorcraft is used by the navigation assistance system to construct a dynamic representation of the outside world that is displayed in a brown-out/white-out situation.

The current navigation data of the rotorcraft is incorporated in the images while they are being captured by generating metadata that is used by the navigation assistance system for constructing and displaying a representation of the outside world depending on how the current state vector of the rotorcraft varies, with this being referred to below in this specific circumstance as the "reconstituted world".

For this purpose, simultaneous mapping and localizing means operate by calculation to generate maps with incorporated localization by performing known calculation processes, such as for example calculation processes commonly referred to as simultaneous localization and mapping (SLAM) or as concurrent mapping and localization (CML). By way of example, reference may be on this topic to the document "Visual SLAM for flying vehicles", IEEE Transactions on Robotics, IEEE Service Center, Piscataway N.J., US, Vol. 24, No. 5, Oct. 1, 2008 (2008-10-01), pp. 1088-1093, DOI: 10.1109/TRO.2008.2004521.

A method of calculation using specific Kalman filters can be used to improve the pertinence of the maps that are constructed with incorporated localization. On this topic, reference may be made for example to the document "High resolution terrain mapping using low altitude aerial stereo imagery" (Il-Kyun Jung et al.), Proceedings of the ninth IEEE international conference on computer vision (ICCV), Nice, France, Oct. 13-16, 2003, International Conference on Computer Vision, Los Alamitos, Calif.: IEEE Comp. Soc, US, Vol. Conf. 9, Oct. 13, 2003, pp. 946-951, XP010662483, DOI: 10.11/ICCV 2003.1238450.

The simultaneous mapping and localization calculation processes are based on incrementally constructing maps with incorporated localization by means of predictive calculation algorithms conventionally making use of Kalman filters. The maps with incorporated localization are constructed from metadata incorporated in the captured images, which have allocated thereto the navigation data as identified sequentially by the on-board instrumentation simultaneously with the sequential camera pickup of the captured images.

The images captured individually at any given instant by the cameras in a given set are used to provide the navigation assistance system with metadata relating to the territories captured at a given instant by the cameras of a single set, referred to below as the "captured territories". The maps with incorporated localization are thus successively generated in flight by a simultaneous mapping and localization calculation process and they are stored at a given repetition rate in a database for maps with incorporated localization.

In order to improve the pertinence of such databases of maps with incorporated localization, various sources of information may be used, such as those proposed in the document "Helicopter synthetic vision based DVE processing for all phases of flight" (Patrick O'Brien, David C. Baughman, H. Bruce Wallace) Degraded visual environments: enhanced, synthetic, and external vision solutions 2013, Vol. 8737, May 16, 2013 (2013-05-16), xp00273134, DOI: 10.1117:12.2016555.

The database of maps with incorporated localization is used in flight by a data processor unit to generate the construction and the dynamic display of the reconstituted world. For this purpose, the processor unit operates by calculation to compare the current navigation data of the rotorcraft with the navigation data incorporated in the various maps having incorporated localization that are stored in the database in order to generate the display of the reconstituted world.

More particularly, the processor unit identifies and extracts the maps with incorporated localization as a function of the variation in the current navigation data of the rotorcraft in order to construct and display the reconstituted world with display dynamics that vary depending on the current navigation data of the rotorcraft.

By way of example, reference may be made to Document EP 2 133 662 (Honeywell Int. Inc.), which discloses such ways of constructing and displaying a reconstituted world complying with the environment outside a host platform by means of a navigation assistance system that performs a process of simultaneous mapping and localization calculation process.

In this context, the reconstituted world may be displayed to provide the pilot with navigation assistance in the event of a sudden loss-of-visibility situation such as in the presence of fog banks or clouds of particles around the rotorcraft, in particular in a brown-out/white-out situation. For this purpose, the navigation assistance system incorporates means for detecting a brown-out/white-out situation that cause the processor unit to be put into operation and the reconstituted world to be displayed in order to mitigate the loss of the pilot's visibility by the environment outside the rotorcraft.

By way of example, such a brown-out/white-out situation may be detected:

by identifying the presence of a cloud of particles by analyzing the pixels that define the captured images, and more particularly by analyzing their density. The analysis of the pixels defining the captured images needs to be performed in ways that make it possible to identify the brown-out/white-out situation very quickly, while nevertheless being sufficiently reliable to authorize or not authorize the display of the reconstituted world depending on requirements;

by comparing by calculation the current height above the ground of the rotorcraft with a ground height threshold that conventionally gives rise to a brown-out/white-out situation, such as said distance between the rotorcraft and the ground being less than 15 m. Such a solution is commonly preferred since it makes it possible to obtain an identification of a brown-out/white-out situation rapidly on the basis of modest calculation capacity; and more simply, by activation of a display control member by a pilot when confronted with a brown-out/white-out situation or, in a situation with visibility, by a pilot merely desiring to have the reconstituted world available in augmented reality with virtual images superposed on the real view.

In this context, the navigation assistance provided by constructing and displaying the reconstituted world requires considerable calculation power and memory. Such calculation power and memory must be available on board the rotorcraft in order to enable the reconstituted world to be constructed and displayed as quickly as possible depending on variation in the current navigation data of the rotorcraft with high-performance in the reliability, the visual quality, and the dynamic variation of the display.

More particularly, the calculation operations performed by the navigation assistance system require large calculation capacities and memory for achieving calculation frequencies that are good for:

capturing and processing images captured by the cameras as high-speed sequences in order to procure satisfactory visual quality for the captured images and in order to generate the metadata from which the maps with incorporated localization are prepared;

obtaining the largest possible number of accurate maps with incorporated localization that are available quickly in order to provide the processor unit with sufficient resources for constructing and displaying the reconstituted world and in order to provide the pilot with navigation assistance that is reliable and comfortable; and displaying the reconstituted world with the displayed images being refreshed at high rates so as to cause the displayed reconstituted world to vary dynamically with display fluidity that is comfortable and reassuring for the pilot.

In addition, the reliability, the pertinence, and the fluidity with which the displayed dynamics of the reconstituted world vary depend on the immediate availability in good time of all of the information that needs to be mutually correlated during the various operations that lead to the reconstituted world being constructed and displayed.

As a result there is an ongoing search for a navigation assistance system of high performance that provides a display of the reconstituted world that is reliable, pertinent, and with good quality and good dynamic variation in the display, while nevertheless being subjected to a constraint involving limited capacity in terms of calculation power and memory needed for obtaining such a display quickly.

In the field of image processing by calculation, it is conventional to use processor units such as field programmable gate arrays (FPGAs). FPGA processor units or analogous processor units enable the logic circuits of the calculation means used by the processor units to be reconfigured. Depending on the choices made by the programmers concerning the ways in which the processor unit is to operate, the calculation logic circuits are configured to optimize data processing and exchanges between one another.

In the field of navigation assistance systems providing a dynamic display of the outside world, a common solution for optimizing the use of the capacities of the calculation and memory means on board a rotorcraft is to restrict the calculation operations that are to be performed by making use of a database of maps with incorporated localization that has been prepared on the ground prior to the flight mission of the rotorcraft. Such a database is constructed from images captured by any rotorcraft during previous flight missions.

Such a solution presents the advantage of reducing the calculation operations that need to be performed in flight and consequently of enabling the calculation and memory capacities of the navigation assistance system on board the rotorcraft to be reserved for constructing and displaying the reconstituted world.

Nevertheless, such a solution is not satisfactory because of the loss of pertinence in the information delivered by the database of maps with incorporated localization when they are prepared prior to the flight mission of the rotorcraft.

Furthermore, it is appropriate to optimize the use of an on-board navigation assistance system that provides, where necessary, a dynamic display of the representation of the outside world. For example, it is advantageous on the ground to make use of the information stored and/or generated during a flight mission by the navigation assistance system in order, a posteriori, to analyze said flight mission and/or the territories overflown by the rotorcraft.

Nevertheless, in addition to such potential uses, it would appear to be opportune to seek to implement other potential uses of the navigation assistance system. Such efforts should naturally be undertaken while taking account of constraints associated with searching for a high performance navigation assistance system while nevertheless having limited calculation and memory power but still capable of delivering in good time the information needed for constructing and displaying the reconstituted world in the context of the above-mentioned constraints.

BRIEF SUMMARY OF THE INVENTION

In this context, the object of the present invention is to propose a method of using a navigation assistance system to display a representation of the outside world in the event of a loss of visibility, such as conventionally generated by a brown-out/white-out situation. On the basis of the above observations from which the present invention stems, it is more particularly desired to optimize the use that is made in flight of the navigation assistance system while making a satisfactory compromise between the various above-mentioned constraints.

The method of the present invention is a method performed in flight by a navigation assistance system of a rotorcraft by constructing a dynamic representation of the outside world and by displaying it on a screen. The method of the present invention comprises the following operations performed in flight:

on request of the pilot, sequentially capturing front images relating to the environment outside the rotorcraft. Such a request from the pilot may for example be made by activating an image capture button dedicated to making this request. The front images are captured by at least one set of front cameras on board the rotorcraft and looking along a common front line of sight for conventionally delivering stereoscopic images to a processor unit of the navigation assistance system;

sequentially preparing by calculation front maps with incorporated localization based on the front images and on navigation data of the rotorcraft. Conventionally, such navigation data comprises in particular at least the state vector of the rotorcraft and is typically delivered by the on-board instrumentation of the rotorcraft simultaneously with the sequential capture of the front images. Thereafter, said front maps with incorporated localization are stored in a first database; and identifying a loss-of-visibility situation leading to a first dynamic representation of the outside world being constructed by calculation and displayed dynamically on the screen, which representation is referred to as the "reconstituted world", as defined above. The construction and the display of the reconstituted world are performed on the basis of sequentially extracting front maps with incorporated localization as stored in the first database depending on how the current navigation data of the rotorcraft varies in comparison with the navigation data incorporated in the front maps with incorporated localization.

According to the present invention, such a method is remarkable mainly in that it comprises the following operations:

simultaneously with capturing the front images, sequentially capturing complementary images relating to the outside world by means of complementary sets of cameras. The stereoscopic images delivered individually by the cameras of the various sets of cameras of the rotorcraft are referred to below as "captured images".

The complementary sets of cameras comprise at least one set of right lateral cameras, at least one set of left lateral cameras, and at least one set of rear cameras.

The cameras in any given complementary set of cameras naturally look along a common line of sight in order to provide, in conventional manner, stereoscopic images of territories as picked up at a given instant by a given set of cameras. More particularly, it should naturally be understood that the cameras of the right lateral set of cameras look along a common right lateral line of sight, the cameras of the left lateral set of cameras look along a common left lateral line of sight, and the cameras of the rear set of cameras look along a common rear line of sight;

allocating by calculation to each of the captured images both time data delivered by the on-board instrumentation and origin data relating to the identity of the set of cameras from which the captured images stem. Such an operation of allocating by calculation digital time data and origin data to the captured images give rise to metadata. Such metadata is generated for each of the captured images, and associates at least the captured images, said time data, and said origin data. The metadata includes front metadata specific to the front images and incorporated in the maps with incorporated localization stored in said first database. The metadata also includes complementary metadata specific to the complementary images respectively delivered by given sets of complementary cameras;

storing the complementary metadata in a second database and preparing sequentially by calculation said front maps with incorporated localization; and on request of the pilot, constructing by calculation and displaying on the screen a second dynamic representation of the outside world referred to as the "extrapolated" world.

By way of example, such a request from the pilot is made by activating a control button dedicated to making this request and referred to as the extrapolated world display button. The extrapolated world is made up of front maps with incorporated localization extracted sequentially from the first database depending on how the current navigation data of the rotorcraft varies in comparison with the navigation data incorporated in the front maps with incorporated localization.

The complementary terrain elevation data coming from the complementary metadata is added to said front maps with incorporated localization extracted from the first database when constructing and dynamically displaying said extrapolated world. Said adding is performed by correlating the time and origin data respectively allocated to the front images and to the complementary images.

These provisions are such that depending on how the current navigation data of the rotorcraft is varying, said correlation identifies the relative positions between the front maps with incorporated localization and the complementary terrain elevation data coming from captured images delivered at the same time by the various sets of cameras.

The complementary terrain elevation data is potentially constituted at least in part by the complementary metadata that is selectively extracted from the second database and added to the front maps with incorporated localization.

The complementary terrain elevation data is likewise potentially constituted at least in part by complementary maps with incorporated localization previously constructed and stored in a third database.

The complementary maps with incorporated localization are constructed from the complementary metadata incorporating the navigation data of the rotorcraft as delivered by the on-board instrumentation simultaneously with sequentially capturing the complementary images.

The prior construction of the complementary maps with incorporated localization is in particular performed, providing the navigation assistance system has calculation capacity, said calculation capacity being evaluated as being available in comparison with a predetermined calculation capacity threshold.

In a preferred implementation, the extrapolated world is constructed in part on a priority basis from complementary maps with incorporated localization when they are available, and otherwise from the complementary images.

More particularly, following the request from the pilot for construction and dynamic display of the extrapolated world, the method further comprises the following operations:

as the display of the extrapolated world varies dynamically, verifying by calculation the availability of complementary maps with incorporated localization suitable for being correlated with the front maps with incorporated localization in order to construct and display the extrapolated outside world; then if complementary maps with incorporated localization are available, constructing and displaying the extrapolated world, otherwise:

preparing complementary maps with incorporated localization needed for constructing and displaying the extrapolated world, providing the navigation assistance system has calculation capacity that is evaluated as being available relative to said calculation capacity threshold; else extracting by calculation from the second database the complementary metadata needed for constructing and displaying the extrapolated world.

In a preferred implementation, the pilot may select either to wait for calculation capacity to become available for constructing the secondary maps with incorporated localization needed for constructing and dynamically displaying the extrapolated world, or may in an emergency make use directly of the complementary metadata for constructing and displaying the extrapolated world.

The pilot may select to make immediate use of the complementary metadata in particular by activating a control member dedicated to this function and referred to as the member for stopping preparation of complementary maps with incorporated localization.

More particularly, in a preferred implementation, the operation of extracting by calculation from the second database the complementary metadata needed for constructing and dynamically displaying the extrapolated world depends on the pilot making a request.

Furthermore, it is preferably possible to sort the images captured by the various sets of cameras in order to exclude images that are analyzed as not being pertinent.

More particularly, during the operation of sequentially capturing the captured images, the method includes a step of selecting captured images by calculation in application of at least one predefined pertinence criterion relating to territorial continuity between the various captured territories picked up at a given instant by the various sets of cameras of the rotorcraft. The captured images that are deduced as not being pertinent relative to said pertinence criterion are eliminated prior to being processed by the navigation assistance system.

Said at least one pertinence criterion is preferably predefined depending on anyone of at least one of the following calculation parameters:

a first distance threshold between the rotorcraft and a captured territory that is picked up at a given instant by any of the sets of cameras; and a second distance threshold between the various captured territories that are picked up at a given instant by the various sets of cameras of the rotorcraft.

The information relating to distances between the rotorcraft and any said captured territory is conventionally delivered by the sets of cameras generating stereoscopic images.

In an advantageous implementation, the method further includes ways of identifying territories of interest making it possible to establish and display a flight plan between a current position of the rotorcraft and at least one said territory of interest.

For this purpose, during the operation of sequentially capturing the captured images, the method also includes a step of identifying at least one captured territory referred to as a "territory of interest". The identifying step is performed by applying at least one predefined criterion of interest relating to the suitability of said territory of interest for being used by the rotorcraft. At the end of said identification step, data of interest is selectively incorporated in the metadata from which the captured images relating to said territory of interest is derived.

Consequently, and in a preferred implementation of the invention, the method includes, in particular on request from the pilot performed by the pilot activating a flight plan preparation control member dedicated to this function, an operation of preparing a flight plan between the current position of the rotorcraft and said at least one territory of interest.

Said flight plan is potentially displayed superposed on the representation of the outside world displayed on the screen. Such superposition is possibly displayed on the reconstituted world and/or on the extrapolated world.

In an implementation, said identification step may be performed by the pilot of the rotorcraft. The data of interest is incorporated in the metadata on request of the pilot, in particular by the pilot activating a control member dedicated to this function and referred to as the captured image marking control member.

In another implementation, that may be considered in isolation or in combination with the preceding implementation, said identification step is potentially an operation of processing the pixels of the images by an algorithm of the shape recognition type. Under such circumstances, the data of interest is incorporated in the metadata by calculation in compliance with at least one predefined shape being recognized in the captured images as a result of said operation of processing the pixels of the images algorithmically.

By way of example, said recognition of the predefined shape may be performed conventionally by applying processing to the pixels of the images using an algorithm of the shape recognition type by comparing the captured images with such predefined shapes available in a previously established auxiliary database.

In various implementations considered in isolation or in combination, said at least one criterion of interest is at least any one of the following criteria of interest relating to the suitability of the territory of interest for constituting for the rotorcraft: a landing zone, a refuge zone, a danger zone, and/or an intervention zone.

Furthermore, the identification of said loss-of-visibility situation is potentially performed in application of at least one of any one of the following operations:

an operation of analyzing by calculation the pixels that define the captured images;

an operation of comparison by calculation between the current height above the ground of the helicopter and a threshold height above the ground identified as generating a loss-of-visibility situation (brown-out/white-out); and/or on request of the pilot confronted with a loss-of-visibility situation.

In the context of analyzing by calculation the pixels defining the captured images, it is proposed to analyze more particularly the variance in the intensity of the pixels of the captured images in order to identify said loss-of-visibility situation.

More particularly, and in an advantageous implementation of the operation of performing analysis by calculation of the pixels defining the captured images, the method comprises an operation of verifying whether to display the reconstituted world by performing the following steps:

sampling sequentially by calculation at a given frequency a predefined number of front images referred to as "sampled front images";

establishing by calculation a moving range of a predefined number of said sampled front images;

calculating a first variance of intensity of the pixels of a median sampled front image of said range and comparing by calculation said first calculated variance with a first variance threshold for intensity of pixels; then in the event of said first calculated variance being greater than said first variance threshold, reiterating the step of sampling the front images, otherwise authorizing construction and dynamic display of the reconstituted world.

Thereafter, the method includes an operation of verifying whether to display the extrapolated world by performing the following steps:

in the event of construction of the reconstituted world being authorized as a result of it being verified that the reconstituted world may be displayed, calculating second variances of intensity of pixels in the captured images that are picked up at a given instant by the various sets of cameras and considered in pairs;

comparing by calculation said second variances with a second variance threshold for intensity of pixels, and then in the event of at least one of said second variances being greater than the second variance threshold, reiterating the operation of verifying whether the reconstituted world should be displayed, in particular from the step of sampling the frontal images, otherwise authorizing the construction and the display of the extrapolated world; and then comparing said second variances with a third variance threshold for the intensity of pixels having a value greater than said second variance threshold, and then in the event that said second variances are greater than the third variance threshold, prohibiting the construction and display of the extrapolated world while continuing to perform the operation of verifying whether the reconstituted world should be displayed, otherwise maintaining the construction and dynamic display of the extrapolated world.

BRIEF DESCRIPTION OF THE SEVERAL VIEWS OF THE DRAWINGS

Implementations of the present invention are described with reference to the figures of the accompanying sheets, in which:

FIG. 1 comprises two associated diagrams (a) and (b), with diagram (a) showing a rotorcraft fitted with a navigation assistance system of the present invention and with diagram (b) showing the ways in which images are acquired and displayed dynamically for various representations of the outside world by using said navigation assistance system;

FIG. 3 is a block diagram showing ways in which the pixels of the images acquired by the navigation assistance system of the rotorcraft shown in FIG. 1 are analyzed by calculation.

Elements and operations that are common to different figures are designated respectively therein by common names, being identified using the same reference numbers and/or letters.

DETAILED DESCRIPTION OF THE INVENTION

Figure 2:
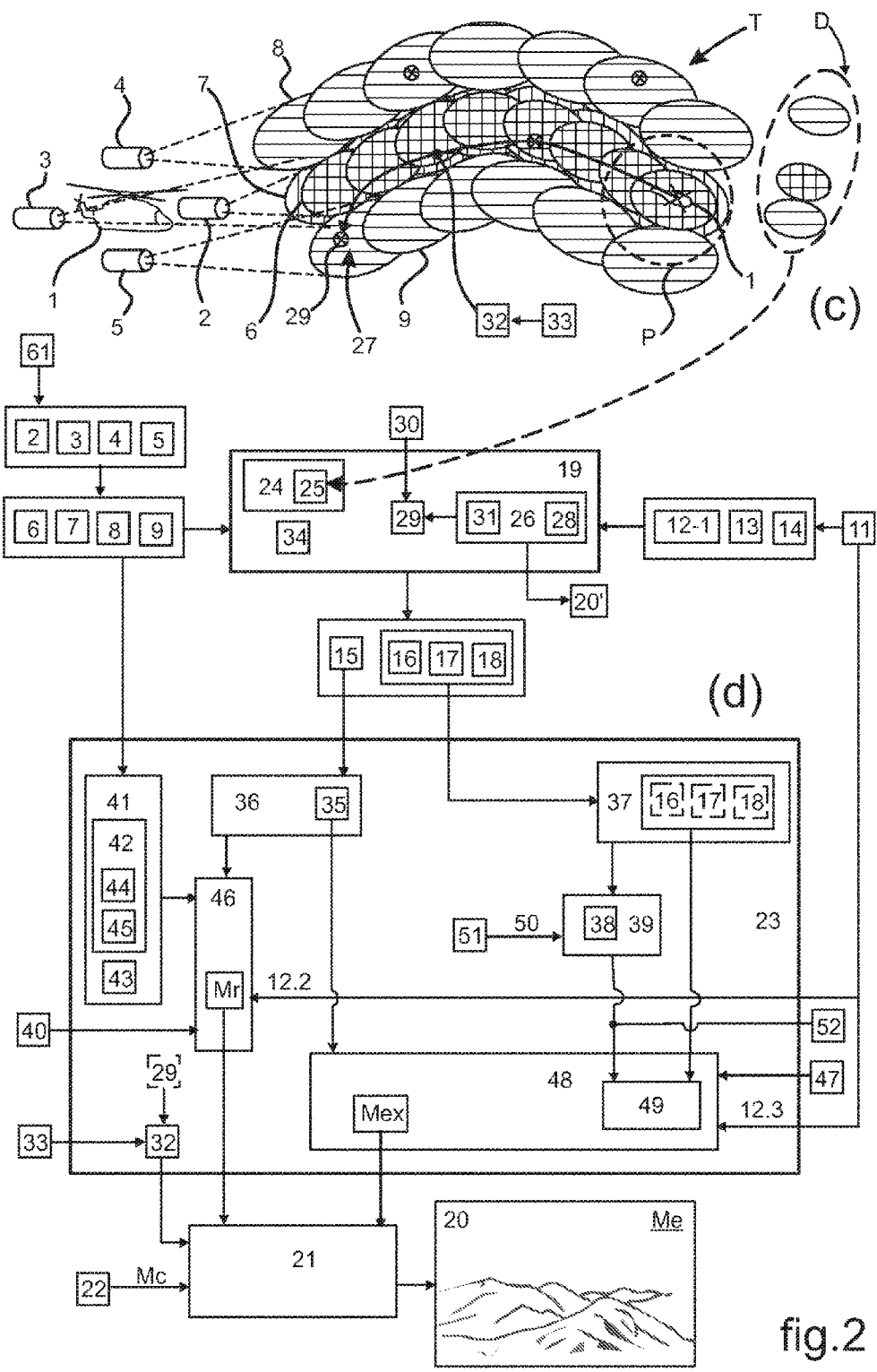
FIG. 2 is made up of two associated diagrams (c) and (d), with the diagram (c) showing how images are acquired along a run followed by the rotorcraft shown in diagram (a) of FIG. 1, and with diagram (d) showing the processes of such image acquisition and image construction followed by dynamic display of various representations of the outside world shown in diagram (b)

In FIG. 1, a rotorcraft 1 has a navigation assistance system that operates in flight by displaying various dynamic representations of the surroundings outside the rotorcraft, referred to as the outside world Me.

To this end, the rotorcraft 1 has various sets of cameras 2, 3, 4, 5 for acquiring images 6, 7, 8, 9 that are captured by the cameras relating to various territories 10 successively overflown by the rotorcraft 1 during a flight. The captured images 6, 7, 8, 9 are stereoscopic images derived from images delivered individually by the cameras in a given set of cameras, from which stereoscopic images are constructed and displayed in flight showing various representations of the outside world Me. More particularly, the rotorcraft 1 is provided with:

at least one set of forward cameras 2 facing towards the front of the rotorcraft 1 relative to the forward travel direction S of the rotorcraft 1. The cameras in said at least one set of front cameras 2 look along a common line of sight in order to capture stereoscopic front images 6;

at least one set of rear cameras 3 facing towards the rear of the rotorcraft 1 relative to the forward travel direction S of the rotorcraft 1. The cameras in said at least one set of rear cameras 3 look along a common rearward line of sight in order to capture stereoscopic rear images 7;

at least one set of right lateral cameras 5 facing laterally to the right of the rotorcraft 1 relative to the forward travel direction S of the rotorcraft 1. The cameras of said at least one set of right lateral cameras 5 look along a common right lateral line of sight for capturing stereoscopic right lateral images 8;

at least one set of left lateral cameras 4 facing laterally to the left of the rotorcraft 1 relative to the forward travel direction S of the rotorcraft 1. The cameras of said at least one set of left lateral cameras 4 look along a common left lateral line of sight to capture stereoscopic left lateral images 9.

The concepts of "stereoscopic right lateral images" 8, of "stereoscopic left lateral images 9", and of "stereoscopic rear images" 7 are grouped together below under the overall concept of "complementary images" 7, 8, 9.

Furthermore, the stereoscopic images delivered by the various sets of cameras when taken as a whole and including both the front images 6 and the complementary images 7, 8, 9, are referred to as "captured images".

The rotorcraft 1 is also conventionally fitted with on-board instrumentation 11 commonly generating navigation data 12 (12-1; 12-2; 12-3) comprising at least the current state vector of the rotorcraft 1 representative of its relative or absolute position, of its orientation, and/or of its change of attitude as it progresses.

The on-board instrumentation 11 of the rotorcraft 1 also delivers time data 13 and origin data 14 for identifying the set of cameras 2, 3, 4, 5 from which the captured images 6, 7, 8, 9 are derived. Such origin data 14 serves to associate the various captured images 6, 7, 8, 9 with the sets of cameras 2, 3, 4, 5 from which they come respectively, and consequently enables them to be used to deduce the relative positions of the various captured images 6, 7, 8, 9 relative to one another by calculation.

On request 61 of the pilot, the cameras in the various sets of cameras 2, 3, 4, 5 are operated to deliver captured images 6, 7, 8, 9 to an image acquisition unit 19. The image acquisition unit 19 processes the captured images 6, 7, 8, 9, the navigation data 12, the time data 13, and the origin data 14 in order to generate metadata 15, 16, 17, 18 used by a processor unit 23 in order to construct various representations of the outside world Me, including a reconstituted world Mr and/or an extrapolated world Mex.

The various metadata comprises front metadata 15, rear metadata 16, right lateral metadata 17, and left lateral metadata 18. The rear metadata 16 belonging to the rear images, the right lateral metadata 17 belonging to the right lateral images, and the left lateral metadata 18 belonging to the left lateral images is all grouped together under the concept of "complementary metadata" 16, 17, 18.

The reconstituted world Mr and/or the extrapolated world Mex are displayed on a screen 20 by means of a display unit 21 making use for this purpose of the information delivered by the processor unit 23.

On the request 22 of the pilot, a current outside world Mc is potentially displayed on the screen 20. The current outside world Mc is displayed via the display unit 21, potentially either on the basis of the front images 6 alone, or else on all of the images 6, 7, 8, 9 captured by the various sets of cameras 2, 3, 4, 5.

When displaying the current outside world Mc on the basis of the images 6, 7, 8, 9 captured by the various sets of cameras 2, 3, 4, 5, the various captured images 6, 7, 8, 9 are potentially displayed in distinct display windows positioned relative to one another on the screen 20 in the relative positions of the various sets of cameras 2, 3, 4, 5 on board the rotorcraft 1.

In FIG. 2, an example of a run T performed by the rotorcraft 1 is shown in diagram (c). As the rotorcraft 1 progresses, various sets of cameras 2, 3, 4, 5 deliver the captured images 6, 7, 8, 9 to the image acquisition unit 19 sequentially at a given frequency.

While picking up the captured images 6, 7, 8, 9, a step 24 of selecting the captured images 6, 7, 8, 9 is performed by calculation in order to validate use of those images while avoiding encumbering the memory means and/or saturating the calculation capacities of the navigation assistance system with images that are considered to be unusable relative to a predefined pertinence criterion 25.

One such pertinence criterion 25 relates in particular to a territorial discontinuity D between the various captured territories 10 that are captured at the same instant by the various sets of cameras 2, 3, 4, 5. At the end of this selection step 24, the captured images 6, 7, 8, 9 that are deduced by calculation as being non-pertinent with respect to the criterion of interest 25 are eliminated.

Furthermore, still while acquiring the captured images 6, 7, 8, 9, a step 26 of identifying a territory of interest 27 is performed by the pilot of the rotorcraft and/or on the basis of an analysis by calculation of the captured images 6, 7, 8, 9. Such a territory of interest 27 is evaluated by applying at least one predefined criterion of interest 28 relating to the use the rotorcraft 1 might make of the territory of interest 27, such as a suitability of the territory of interest 27 for constituting a landing zone, a refuge zone, a danger zone, or indeed an intervention zone for examples.

In the event of a territory of interest 27 being identified, digital data of interest 29 is incorporated in the metadata 15, 16, 17, 18. The incorporation of the data of interest 29 may potentially be performed manually on request 30 from the pilot and/or may be generated automatically by processor means 31 for processing the captured images 6, 7, 8, 9 using algorithms of the shape recognition type.

Identification of territories of interest 27 may be used subsequently for generating a flight plan 32 on request 33 of the pilot. Said flight plan 32 is generated from the current position of the rotorcraft 1 going towards at least one previously-identified territory of interest 27. In order to assist the pilot in preparing the flight plan 32, the territories of interest 27 may be referenced depending on their criterion of interest in a list of territories of interest 27 that may be generated and displayed on an auxiliary screen 20' during the identification step 26.

A step 34 of texturing the captured images 6, 7, 8, 9 may be performed in order to optimize the visual quality and the observational comfort of the outside world Me as displayed on the screen 20. At this stage of the description, it should be observed that such a texturing step 34 is preferably performed by the image acquisition unit 19 or may be performed by the processor unit 23 while preparing maps with incorporated localization derived from the captured images 6, 7, 8, 9, or indeed by the display unit 21 while displaying representations of the outside world Me.

The metadata 15, 16, 17, 18 is transmitted to the processor unit 23 in order to construct the reconstituted world Mr and/or the extrapolated world Mex.

Front maps 35 with incorporated localization firstly are prepared on a priority basis on the basis of the front metadata 15 as the front images 6 are captured and also are stored in succession in a first database 36. The complementary metadata 16, 17, 18 are stored pending in a second database 37 in order to optimize the availability of calculation capacity for the navigation assistance system in preparing as quickly as possible the front maps 35 with incorporated localization.

In the event of the navigation assistance system having available calculation capacity 50 (i.e. capacity that is available relative to a calculation capacity threshold 51 that takes account of the priority constraints of preparing the front maps 35 with incorporated localization), complementary maps 38 with incorporated localization may be prepared on the basis of the complementary metadata 16, 17, 18. The complementary maps 38 with incorporated localization are stored in a third database 39 as they are prepared, depending on the availability of calculation capacity in the navigation assistance system.

The process of preparing complementary maps 38 with incorporated localization may be interrupted temporarily as a function of the immediate availability of calculation capacity for the navigation assistance system. At this stage in the preparation of the complementary maps 38 with incorporated localization it is preferred to make use of the complementary metadata 16, 17, 18 in an order that takes account of the most recently captured complementary images 7, 8, 9 going towards complementary images 7, 8, 9 that were captured longer ago.

In the event of it being identified that the pilot has suffered a sudden loss of visibility of the environment outside the rotorcraft 1, such as in a fog bank situation or in the event of clouds of particles being formed such as a brown-out/white-out situation, the processor unit 23 is suitable for generating a display of a reconstituted world Mr constructed on the basis of the previously prepared front maps with incorporated localization.

Such a loss-of-visibility situation P may potentially be identified on the request 40 of the pilot when confronted with such a situation, or it may be identified by a calculation unit 41 performing an operation 42 of analyzing the variance of intensity of the pixels in the captured images 6, 7, 8, 9. The loss of visibility P may also potentially be identified by the calculation unit 41 performing a comparison 43 between the current height above the ground of the rotorcraft 1 as delivered by the on-board instrumentation 11 and a predefined threshold for height above the ground.

The operation 42 of analyzing the variance of the intensity of pixels in the captured images 6, 7, 8, 9 comprises more particularly a first operation 44 of verifying whether the reconstituted world Mr should be displayed, which operation is followed, in the event of a request to display the extrapolated world Mex, by a second operation 45 of verifying whether the extrapolated world Mex should be displayed.

In the event of a loss of visibility P being identified, an operation 46 of constructing the reconstituted world Mr is performed by the processor unit 23, the reconstituted world Mr then being displayed on the screen 20 by the display unit 21. For this purpose, front maps 35 with incorporated localization are extrapolated from the first database 36 as a function of the current navigation data 12-2 of the rotorcraft 1 as delivered by the on-board instrumentation 11 and compared with the various pieces of navigation data 12-1 incorporated respectively in the front metadata 15 from which the front maps 35 with incorporated localization are derived.

Furthermore, on request 47 of the pilot, an operation 48 of constructing the extrapolated world Mex is performed by the processor unit 23, the extrapolated world Mex then being displayed on the screen 20 by the display unit 21. The extrapolated world Mex is constructed from the front maps 35 with incorporated localization as a function of the current navigation data 12-3 of the rotorcraft 1, such that depending on the ways in which the reconstituted world Mr is constructed, complementary data concerning the elevation of the terrain 49 coming form the complementary metadata 16, 17, 18 is added to the front maps 35 with incorporated localization.

The complementary terrain elevation data 49 is added to the front maps 35 with incorporated localization by correlating the time data 13 and the origin data 14 as incorporated respectively in the front metadata 15 and in the complementary metadata 16, 17, 18.

More particularly, as mentioned above, variation in the current navigation data 12-3 of the rotorcraft 1 is used to extract front maps 35 with incorporated localization. Depending on the origin data 14 and on the time data 13, the complementary metadata 16, 17, 18 from the complementary images 7, 8, 9 captured simultaneously with the front images 6 from which the front maps 35 with incorporated location is derived is extracted from the second database 37 in order to constitute the complementary terrain elevation data 49 that is added to the front maps 35 with incorporated localization.

The extrapolated world Mex is then displayed by juxtaposing the front maps 35 with incorporated localization and the complementary terrain elevation data 49 added to the front maps 35 with incorporated localization as a function of the origin data identifying their positions relative to one another depending on the relative positions of the various sets of cameras 2, 3, 4, 5 on board the rotorcraft 1.

The complementary terrain elevation data 49 may potentially be constituted by complementary maps 38 with incorporated localization that have been previously been prepared and that are extracted from the third database 39 and/or that are constituted by the complementary metadata 16, 17, 18.

More particularly, if there are no complementary maps 38 with incorporated localization available, either the missing complementary maps 38 with incorporated localization are prepared, assuming that sufficient calculation capacity 50 is available in the processor unit 23 with respect to the calculation capacity threshold 51, or else the complementary metadata 16, 17, 18 can be used directly to be added to the front maps 35 with incorporated localization on the basis of which the extrapolated world Mex is constructed.

A lack of complementary maps 38 with incorporated localization may also result from the pilot issuing a request 52 for being provided rapidly with the extrapolated world Mex without having to wait for all of the necessary complementary maps 38 with incorporated localization to be constructed and/or in order to accelerate the rate at which the extrapolated world Mex is displayed dynamically as a function of the available calculation capacity 50 of the navigation assistance system.

In an advantageous implementation, time information may be displayed in order to provide the pilot with assistance in decision making relating to executing said request 52 to have the extrapolated world Mex available quickly. Such time information advantageously relates to the calculation time needed for obtaining the complementary maps 38 with incorporated localization.

In FIG. 3, the execution of the operations of constructing and displaying the reconstituted world Mr and/or the extrapolated world Mex are subjected to said operation of the processor unit analyzing the variance in the intensity of the pixels of the captured images 6, 7, 8, 9.

During a first verification operation 44, a step 53 is performed of sequentially sampling the front images 6, with a moving range 54 of a predefined number of sampled front images 55 being defined. A first variance is calculated for the intensity of the pixels of a median sampled front image 56 and it is compared with a first variance threshold 57 for the intensity of pixels.

When said calculated variance is greater than said first variance threshold 57, the step of sampling the front images 6 is reiterated. Otherwise, the loss of visibility P is identified. Constructing and displaying the reconstituted world Mr are then authorized.

A second verification operation 45 is performed by the processor unit 23 in the event of the pilot generating the request 47 seeking to cause the extrapolated world Mex to be constructed and displayed. On condition that constructing and displaying the reconstituted world Mr is authorized, a sequential calculation is performed at a given frequency of second variances 58 relating to the intensity of the pixels in the images 6, 7, 8, 9 captured at a given instant by the various sets of cameras 2, 3, 4, 5, said second variances 58 being considered in pairs.

Said second variances 58 are then each compared with a second variance threshold 59 relating to the intensity of pixels. When said second variances 58 are greater than the second variance threshold 59, the sampling of the front images 6 is reiterated. Otherwise, constructing and displaying the extrapolated world Mex are authorized.

Continuing to construction and display of the extrapolated world Mex depends on continuing analysis of said second variances 58, which are compared with a third variance threshold 60 relating to the intensity of pixels and having a value that is higher than said second variance threshold 59.

When said variances 58 are greater than the third variance threshold 60, construction and display of the extrapolated world Mex is no longer authorized in order to release calculation capacity and memory for constructing and displaying the reconstituted world Mr. Otherwise, the extrapolated world Mex continues to be constructed and displayed.

What is claimed is:

1. A method of operating a navigation assistance system of a rotorcraft by constructing and dynamically displaying in flight a representation of the outside world (Me) on a screen, said method comprising the following operations performed in flight:
   on request of the pilot, sequentially capturing front images relating to the environment outside the rotorcraft by means of at least one set of front cameras on board the rotorcraft and oriented along a common front line of sight;
   sequentially preparing by calculation front maps with incorporated localization on the basis of the front images and of navigation data of the rotorcraft provided by the on-board instrumentation simultaneously with the front images being captured sequentially, and then storing said front maps with incorporated localization in a first database; and
   identifying a loss-of-visibility situation leading to a dynamic representation of the outside world (Me) referred to as the "reconstituted" world (Mr) being constructed by calculation and being displayed on the screen on the basis of sequentially extracting front maps with incorporated localization stored in the first database in compliance with variation in the current navigation data of the rotorcraft as compared with the navigation data incorporated in the front maps with incorporated localization;
   simultaneously with capturing front images, sequentially capturing complementary images relating to the environment outside the rotorcraft by means of complementary sets of cameras, stereoscopic images delivered individually by the cameras of the various sets of cameras of the rotorcraft being referred to as "captured" images, the complementary sets of cameras comprising at least one set of right lateral cameras, at least one set of left lateral cameras, and at least one set of rear cameras, the cameras in any given complementary set of cameras being oriented on a common line of sight;
   allocating by calculation to each of the captured images both time data delivered by the on-board instrumentation and origin data relating to the identity of the set of cameras from which the captured images stem, by generating metadata for each captured image, the metadata associating at least the captured images, said time data and said origin data, and including front metadata specific to the front images and incorporated in the maps with incorporated localization that are stored in said first database and also complementary metadata specific to the complementary images delivered by given respective sets of complementary cameras;
   storing the complementary metadata in a second database and preparing sequentially by calculation said front maps with incorporated localization; and
   on request of the pilot, constructing by calculation and displaying on the screen a dynamic representation of the outside world (Me) referred to as the "extrapolated" world (Mex), the extrapolated world (Mex) being made up of the front maps with incorporated localization as extracted sequentially from the first database in compliance with variation in the current navigation data of the rotorcraft as compared with the navigation data incorporated in the front maps with incorporated localization, which front maps with incorporated localization have added thereto complementary terrain elevation data coming from the complementary data, said adding being performed by correlating the time data and the origin data respectively allocated to the front images and to the complementary images, said correlation making use of the variation in the current navigation data of the rotorcraft to identify the relative positions between the front maps with incorporated localization and the complementary terrain elevation data from the captured images delivered at a given instant by the various sets of cameras.

2. The method according to claim 1, wherein the complementary terrain elevation data is constituted at least in part by the complementary metadata that is selectively extracted from the second database and added to the front maps with incorporated localization.

3. The method according to claim 2, wherein following the request from the pilot for construction and dynamic display of the extrapolated world (Mex), the method further comprises the following operations:
as the display of the extrapolated world (Mex) varies dynamically, verifying by calculation the availability of complementary maps with incorporated localization suitable for being correlated with the front maps with incorporated localization in order to construct and display the extrapolated world (Mex); then
if complementary maps with incorporated localization are available, constructing and displaying the extrapolated world (Mex), otherwise:
preparing complementary maps with incorporated localization needed for constructing and displaying the extrapolated world (Mex), providing the navigation assistance system has calculation capacity that is evaluated as being available relative to the calculation capacity threshold; else
extracting by calculation from the second database the complementary metadata needed for constructing and displaying the extrapolated world (Mex).

4. The method according to claim 3, wherein the operation of extracting by calculation from the second database the complementary metadata needed for constructing and dynamically displaying the extrapolated world (Mex) depends on the pilot making a request.

5. The method according to claim 1, wherein the complementary terrain elevation data is constituted at least in part by complementary maps with incorporated localization previously constructed and stored in a third database, the complementary maps with incorporated localization being constructed from the complementary metadata incorporating the navigation data of the rotorcraft as delivered by the on-board instrumentation simultaneously with sequentially capturing the complementary images, the prior construction of the complementary maps with incorporated localization being performed, providing the navigation assistance system has calculation capacity that is evaluated as being available in comparison with a predetermined calculation capacity threshold.

6. The method according to claim 1, wherein during the operation of sequentially capturing the captured images, the method includes a step of selecting captured images by calculation in application of at least one predefined pertinence criterion relating to territorial continuity between the various captured territories picked up at a given instant by the various sets of cameras, the captured images that are deduced as not being pertinent relative to said pertinence criterion being eliminated prior to being processed by the navigation assistance system.

7. The method according to claim 6, wherein at least one pertinence criterion is predefined depending on at least one of the following calculation parameters:
a first distance threshold between the rotorcraft and a captured territory that is picked up at a given instant by any of the sets of cameras; and
a second distance threshold between the various captured territories that are picked up at a given instant by the various sets of cameras of the rotorcraft.

8. The method according to claim 1, wherein during the operation of sequentially capturing the captured images, the method includes a step of identifying at least one captured territory referred to as the "territory of interest", by applying at least one predefined criterion of interest relating to the suitability of said territory of interest for being used by the rotorcraft, at the end of which identification step, data of interest is selectively incorporated in the metadata from which the captured images relating to said territory of interest is derived.

9. The method according to claim 8, wherein, on request from the pilot, the method includes an operation of preparing a flight plan between the current position of the rotorcraft and said at least one territory of interest, said flight plan being displayed superposed on the representation of the outside world (Me) displayed by the screen.

10. The method according to claim 8, wherein said identification step is performed by the pilot of the rotorcraft, and the data of interest is incorporated in the metadata on request of the pilot.

11. The method according to claim 8, wherein said identification step is an operation of processing the pixels of the captured images by an algorithm of the shape recognition type, with the data of interest being incorporated in the metadata by calculation as a result of recognizing at least one predefined shape in the captured images.

12. The method according to claim 8, wherein said at least one criterion of interest is at least any one of the following criteria of interest relating to the suitability of the territory of interest for constituting for the rotorcraft: a landing zone, a refuge zone, a danger zone, and an intervention zone.

13. The method according to claim 1, wherein the identification of said loss-of-visibility situation is performed in application of at least any one of the following operations:
an operation of analyzing by calculation the pixels that define the captured images;
an operation of comparison by calculation between the current height above the ground of the helicopter and a threshold height above the ground identified as generating a loss-of-visibility situation, or on request of the pilot confronted with a loss-of-visibility situation.

14. The method according to claim 1, wherein the method comprises an operation of verifying whether the reconstituted world (Mr) should be displayed, the method performing the following steps:
sampling sequentially by calculation at a given frequency a predefined number of front images referred to as "sampled front images";
establishing by calculation a moving range of a predefined number of said sampled front images;
calculating a first variance of intensity of the pixels of a median sampled front image of said range and comparing by calculation said first calculated variance with a first variance threshold for intensity of pixels; then
in the event of said first calculated variance being greater than said first variance threshold, reiterating the step of sampling the front images, otherwise authorizing construction and dynamic display of the reconstituted world (Mr).

15. The method according to claim 14, wherein the method comprises an operation of verifying whether the extrapolated world (Mex) should be displayed, the method performing the following steps:
in the event of construction of the reconstituted world (Mr) being authorized as a result of it being verified that the reconstituted world (Mr) may be displayed, calculating second variances of intensity of pixels in the captured images that are picked up at a given instant by the various sets of cameras and that are considered in pairs;
comparing by calculation said second variances with a second variance threshold for intensity of pixels, and then in the event of at least one of said second variances being greater than the second variance threshold, reiterating the operation of verifying whether the reconstituted world (Mr) should be displayed, otherwise authorizing the construction and the display of the extrapolated world (Mex); and then comparing said second variances with a third variance threshold for the intensity of pixels having a value greater than said second variance threshold, and then in the event that said second variances are greater than the third variance threshold, prohibiting the construction and display of the extrapolated world (Mex) while continuing to perform the operation of verifying whether the reconstituted world (Mr) should be displayed, otherwise maintaining the construction and dynamic display of the extrapolated world (Mex).

16. The method according to claim 1, wherein the identification of said loss-of-visibility situation is performed in application of at least any one of the following operations:

an operation of analyzing by calculation the pixels that define the captured images;

an operation of comparison by calculation between the current height above the ground of the helicopter and a threshold height above the ground identified as generating a loss-of-visibility situation, and on request of the pilot confronted with a loss-of-visibility situation.

* * * * *